United States Patent
Engler

(10) Patent No.: US 6,896,445 B1
(45) Date of Patent: May 24, 2005

(54) MODULAR ARTIFICIAL REEF, SEA WALL AND MARINE HABITAT

(76) Inventor: Eric Engler, 3233 NE. 5th Ct., Pompano Beach, FL (US) 33062

( * ) Notice: Subject to any disclaimer, the term of this patent is extended or adjusted under 35 U.S.C. 154(b) by 0 days.

(21) Appl. No.: 10/751,386

(22) Filed: Jan. 5, 2004

(51) Int. Cl.$^7$ .................................................. E02B 3/04
(52) U.S. Cl. .............................. 405/25; 405/21; 405/29; 405/34; D25/113; D25/115
(58) Field of Search ............................... 405/15–26, 34, 405/35, 302.6, 29; 52/582.1, 592.1–2, 603–606; 114/267, 294; 404/34, 39–42; D25/113–115, 118

(56) References Cited

U.S. PATENT DOCUMENTS

| | | |
|---|---|---|
| 608,191 A | 8/1898 | Fiegehen |
| 954,283 A | 4/1910 | Hawkes |
| 2,069,715 A | 2/1937 | Arpin |
| 2,549,189 A | 4/1951 | Gabo .......................... 154/45.9 |
| 3,176,468 A | 4/1965 | Nagai et al. |
| 3,368,357 A | 2/1968 | Takamori |
| 3,386,250 A | 6/1968 | Katayama |
| 3,548,600 A | 12/1970 | Stolk, Jr. et al. |
| 3,561,757 A * | 2/1971 | Schillig ...................... D25/114 |
| 3,593,348 A * | 7/1971 | Toerge ....................... D25/113 |
| 3,665,882 A * | 5/1972 | Georgiev et al. ........... 114/266 |
| 3,666,266 A | 5/1972 | Noguchi ..................... 272/60 |
| 3,704,687 A | 12/1972 | Nohmura ....................... 119/3 |
| 3,733,831 A | 5/1973 | Sticker, Jr. |
| 3,896,624 A * | 7/1975 | Chang .......................... 405/29 |
| 4,031,676 A | 6/1977 | Dally ........................... 52/102 |
| 4,083,190 A | 4/1978 | Pey |
| 4,269,537 A | 5/1981 | O'Neill ........................ 405/29 |
| 4,367,978 A | 1/1983 | Schaaf et al. ................ 405/30 |
| 4,388,019 A | 6/1983 | Kajihara ...................... 405/25 |
| 4,431,337 A | 2/1984 | Iwasa .......................... 405/30 |
| 4,502,816 A | 3/1985 | Creter, Jr. et al. ............ 405/30 |
| 4,508,057 A | 4/1985 | Suzuki ........................... 119/3 |
| 4,621,588 A | 11/1986 | Harris ............................ 119/4 |
| 4,711,598 A | 12/1987 | Schaaf et al. ................. 405/30 |
| 4,748,776 A * | 6/1988 | Yu .............................. 52/606 |
| 4,781,492 A | 11/1988 | Shindo ......................... 405/16 |
| 4,840,516 A | 6/1989 | Rambo ......................... 405/33 |
| D302,313 S | 7/1989 | Lenson ....................... D25/117 |
| 4,978,247 A | 12/1990 | Lenson ......................... 405/15 |
| 4,997,311 A | 3/1991 | Van Doren ................... 405/30 |
| 5,024,796 A | 6/1991 | Iwasa .......................... 264/69 |
| 5,080,526 A | 1/1992 | Waters ......................... 405/29 |
| 5,122,015 A | 6/1992 | Shen .......................... 405/284 |
| 5,173,006 A | 12/1992 | Lowe .......................... 405/25 |
| 5,215,406 A | 6/1993 | Hudson ....................... 405/25 |
| 5,246,307 A | 9/1993 | Rauch ......................... 405/25 |
| 5,259,695 A | 11/1993 | Mostkoff ..................... 405/29 |
| 5,413,435 A | 5/1995 | Batlle ......................... 405/284 |
| 5,469,655 A | 11/1995 | Lin .............................. 47/83 |
| 5,564,369 A | 10/1996 | Barber et al. ............... 119/221 |
| 5,622,448 A * | 4/1997 | Baum et al. ................. 405/15 |
| 5,664,387 A * | 9/1997 | Bhatti ......................... 52/604 |

(Continued)

FOREIGN PATENT DOCUMENTS

JP            60037313     *   2/1985           405/29

*Primary Examiner*—Jong-Suk (James) Lee
(74) *Attorney, Agent, or Firm*—Holland & Knight LLP

(57) ABSTRACT

A modular unit intended for use as an artificial reef, marine habitat and/or sea wall which can be placed in stacked structures along the floor of an ocean, bay, or other body of water comprises a top wall, bottom wall, opposed side walls and opposed end walls which are interconnected to form a hollow interior. Each of the walls is formed with one or more openings whose position and size is designed to allow access of marine life into the interior of the units, permit the passage of sunlight therein, direct the flow of sea water into and through the units in a way which increases stability of the units when placed on the ocean floor, and permit alignment of the holes of one unit with those of another when stacked together.

34 Claims, 7 Drawing Sheets

U.S. PATENT DOCUMENTS

| | | | | |
|---|---|---|---|---|
| 5,732,518 A | * | 3/1998 | Roberts | 52/604 |
| 5,769,027 A | | 6/1998 | Adams et al. | 119/238 |
| 5,803,660 A | | 9/1998 | Warren et al. | 405/25 |
| 5,836,265 A | | 11/1998 | Barber et al. | 119/221 |
| 5,860,392 A | | 1/1999 | Jahren | 119/208 |
| 6,041,483 A | | 3/2000 | Burch | 27/1 |
| 6,152,655 A | | 11/2000 | Hull | 405/286 |
| 6,186,702 B1 | | 2/2001 | Bartkowski | 405/25 |
| 6,189,188 B1 | | 2/2001 | O'Hare | 27/1 |
| 6,431,792 B1 | | 8/2002 | Barnes | 405/25 |
| 6,565,283 B1 | | 5/2003 | Hall | 405/21 |
| 6,705,057 B2 | * | 3/2004 | Smyer, III | 52/606 |
| 2004/0156680 A1 | * | 8/2004 | Gibbs | 405/15 |

* cited by examiner

MODULAR ARTIFICIAL REEF, SEA WALL AND MARINE HABITAT

FIELD OF THE INVENTION

This invention relates to an apparatus which functions as an artificial barrier reef, a marine habitat and/or a sea wall in a variety of underwater environments to foster the growth and reproduction of marine life and assist with preventing erosion of beaches.

BACKGROUND OF THE INVENTION

Numerous scientific studies have shown that the depletion of the world's coral reefs is occurring at an alarmingly fast rate. Coral bleaching, as well as man's activities on both the land and water, have led to a decline of as much as 75–90% of the coral reefs in the waters off certain areas in the State of Florida and some estimates indicate that as much as 30% of the entire world's coral reefs have been destroyed in recent years. In addition to providing a habitat for soft and hard corals, coral reefs provide protection from coastal and beach erosion and act as a "nursery" or estuary where a variety of fish and other marine life spawn, grow and live. The coral reefs are at the bottom of the world's food chain, and are thus critical to sustaining life on the planet.

Realizing the importance of maintaining and replenishing the planet's already damaged and destroyed coral reefs, many countries have been working to reverse this trend. In the United States, governmental agencies at both the state and federal level have established artificial reef programs to study and provide solutions to the problem of disappearing reefs. A number of designs have been proposed, but most suffer from one or more deficiencies including high cost, manufacturing difficulties, poor choice of materials. and instability in moderate to severe weather and current conditions.

For example, one popular method of creating artificial reefs has been the sinking of old vessels at selected locations on the floor of an ocean or other body of water. It has been found that a number of corals do not grow well on metal, and many species of fish will not reproduce near or inside of hollow metal structures due to their tendency to resonate ambient sound or amplify noise.

Another method of encouraging the growth of coral which has been utilized in the past is the sinking of vehicle tires, either individually or bundled by attaching them together with rope or metal bands. It has been found that during periods of strong tidal or current activity, particularly during storms and hurricanes, the tires in bundles become detached from one another. These detached tires, and any individual tires placed on the ocean floor, can be moved by the tide and current into contact with existing reefs thus killing the coral and other marine life they were intended to foster.

A number of designs for artificial reefs and sea walls have been suggested in the prior art as an alternative to sunken vessels, tires and other substrates. It is recognized that artificial reefs must include multiple surfaces for coral and other sea life to attach and grow, while providing limited resistance to the flow of water from tides and current. Artificial reefs must also allow sunlight to bathe areas where the coral attaches. Structures having a number of walls interconnected to form an interior wherein each wall is formed with one or more holes or openings which intersect the interior are disclosed, for example, in U.S. Pat. Nos. 3,548,600 to Stolk, Jr. et al, U.S. Pat. No. 5,024,796 to Iwasa, U.S. Pat. No. 5,080,526 to Waters, U.S. Pat. No. 3,386,250 to Katayama, U.S. Pat. No. 5,178,006 to Lowe, U.S. Pat. No. 4,711,598 to Shaaf et al., and U.S. Pat. No. 6,186,702 to Bartkowski. The openings in the walls of structures of this type allow the flow of water through their interiors which helps stabilize them on the floor of the body of water and allows fish and other marine life to swim through their interiors. Many of these patents disclose structures having tapered or angled side walls, which, in combination with the openings in the wall(s), are intended to create an upward flow of water moving past the units. See, for example, the Shaaf et al. patent. This upward flow of water contacts and helps dissipate the force of incoming waves before they reach a beach or other coastal area, thus reducing erosion.

In addition to the stability created by openings in the walls of the units described above, it is known in the prior art to form barriers or sea walls with a bottom wall or base having one or more legs extending downwardly to contact the ocean floor. See, for example, U.S. Pat. Nos. 4,978,247 to Lenson, U.S. Pat. No. 4,089,190 to Pey and Schaaf et al. Lips or other protrusions which extend from the base of prior art patents directed to coral reefs or sea walls are shown in U.S. Pat. Nos. 3,176,468 to Nagai et al and U.S. Pat. No. 3,368,357 to Takamori. All of these designs are intended to help resist movement of the units once they are positioned on the ocean floor, even under high current or tidal conditions.

Artificial reefs and sea walls taught in the prior art can be placed on the floor of an ocean, bay or other body of water either individually or in groups. The patents to Nagai et al and Pey, for example, disclose structures in which barrier units are arranged side-by-side and/or one on top of another. The height and length of the resulting structure can be varied, as desired.

Despite efforts in the prior art to avoid some of the problems encountered with the use of sunken vessels, tires or other objects as coral reefs and sea walls, many deficiencies remain. Many artificial reefs and sea walls are constructed of concrete reinforced with steel bars. Steel bars exposed to salt water over an extended period are subject to rusting, and this has a negative effect on the growth of delicate corals and other sea life.

Although one or more artificial reef and sea wall structures taught in the prior art include hollow interiors and tapered walls with one or more openings to promote growth of coral and other marine life, as well as protrusions extending from the bottom wall to enhance stability on the floor of the ocean or other body of water, such designs are lacking in several respects. None provide an effective construction for arranging a number of individual units in a combined structure which permits the passage of marine life and water throughout the structure. In locations where the floor of the body of water is sandy or covered with silt, protrusions extending from the bottom of one or more units tend to sink in, often to different depths, causing the units to be angled relative to one another if an attempt is made to orient multiple units side-by-side or end-to-end. Rocky ocean floor areas also present a problem of alignment of adjacent units.

Even when units of the type disclosed in the prior art are used individually to create an artificial reef or sea wall, the problem of choice of materials noted above is present and many are relatively unstable when exposed to moderate to high current or tidal forces. In many designs, the weight distribution, is unacceptable compared to the overall height of the unit and they tend to topple over even if provided with protrusions or other anchoring structure on the bottom wall. Although many units include openings in one or more walls as noted above, the small size of such openings relative to the surface area of the wall in which they are formed leads to instability of the unit when impacted by tide and current forces. Such small openings also prevent larger fish from entering the units to use them for shelter, as a spawning ground or an estuarial habitat. Still other designs employ one or more openings in the side or top of the unit, but no ingress or egress for animals thus effectively trapping crustaceans and other marine life in the interior of the unit.

SUMMARY OF THE INVENTION

The modular units of this invention are intended for use as an artificial reef, marine habitat and/or sea wall which can be placed along the floor of an ocean, bay, or other body of water. Each unit includes a top wall, bottom wall, opposed side walls and opposed end walls which are interconnected to form a hollow interior. In one embodiment, the bottom wall is formed with one or more angled openings, and in an alternative embodiment most of the surface area of the bottom wall is open to the hollow interior. The side walls are tapered or angled from the bottom wall to the top wall so that the top wall is much smaller in cross sectional dimension than the bottom wall. Each of the top wall, bottom wall, side walls and end walls is formed with an opening or hole. The size and location of these holes is designed to: (i) allow access of marine life into the interior of the units, (ii) permit the passage of sunlight therein, (iii) direct the flow of sea water into and through the units in a way which increases stability of the units when placed on the ocean floor, and (iv) permit alignment of the holes of one unit with those of another when stacked together, as noted below.

The modular units of this invention are preferably formed of concrete which includes a mixture of bonding agents intended to reduce porosity and absorption of sea water. The concrete is dense and heavy, thus adding to the stability of the units when placed on the ocean floor. No steel bars or other reinforcing members are employed.

Either one or both embodiments of the modular units of this invention can be stacked one on top of the other and located side-by-side in columns and rows to form an artificial reef, sea wall or marine estuary/habitat. Preferably, two modular units are placed side-by-side and a third unit (of either embodiment) is inverted and placed atop the two other units. The holes in the side walls of the modular units are formed to align with those of adjacent units allowing marine life and ocean water to freely pass through the interior of the multiple units. Other units may be placed end-to-end to form columns with those units already located side-by-side in rows. The openings in the end walls of adjacent units within a column align with one another, in a manner similar to the openings in the side walls of units in a given row, to provide further access of marine life to the interior of the overall structure. Essentially, any number of modular units can be positioned in columns and rows to obtain the desired size, shape and height of the reef, sea wall, or marine habitat. When the units are utilized as a sea wall, it is contemplated that the sloped or tapered side walls of the units would be oriented on the ocean floor in the direction of the current or predominant tidal force. The side walls are effective to deflect the water flow vertically upwardly, which tends to cause waves moving toward shore to break at a location further from the beach, thus reducing beach erosion.

A number of alternative embodiments are provided to secure the modular units to the ocean floor to resist dislodgement by currents or other water forces (storms, hurricanes, etc). In one embodiment, the bottom wall of each modular unit is provided with a leg at each corner which fit into corresponding openings in an anchoring device such as a rail system as described below. Alternatively, the bottom wall of the units may be formed with a lip or other protrusion which sink into the sea floor to enhance stability. The units are assembled on land or in the water, and marine grade mortar can be used to connect adjacent units to one another and/or to the anchoring device for added stability.

DESCRIPTION OF THE DRAWING

The structure, operation and advantages of the presently preferred embodiment of this invention will become further apparent upon consideration of the following description, taken in conjunction with the accompanying drawings, wherein.

DETAILED DESCRIPTION OF THE PREFERRED EMBODIMENT

Figure 1:
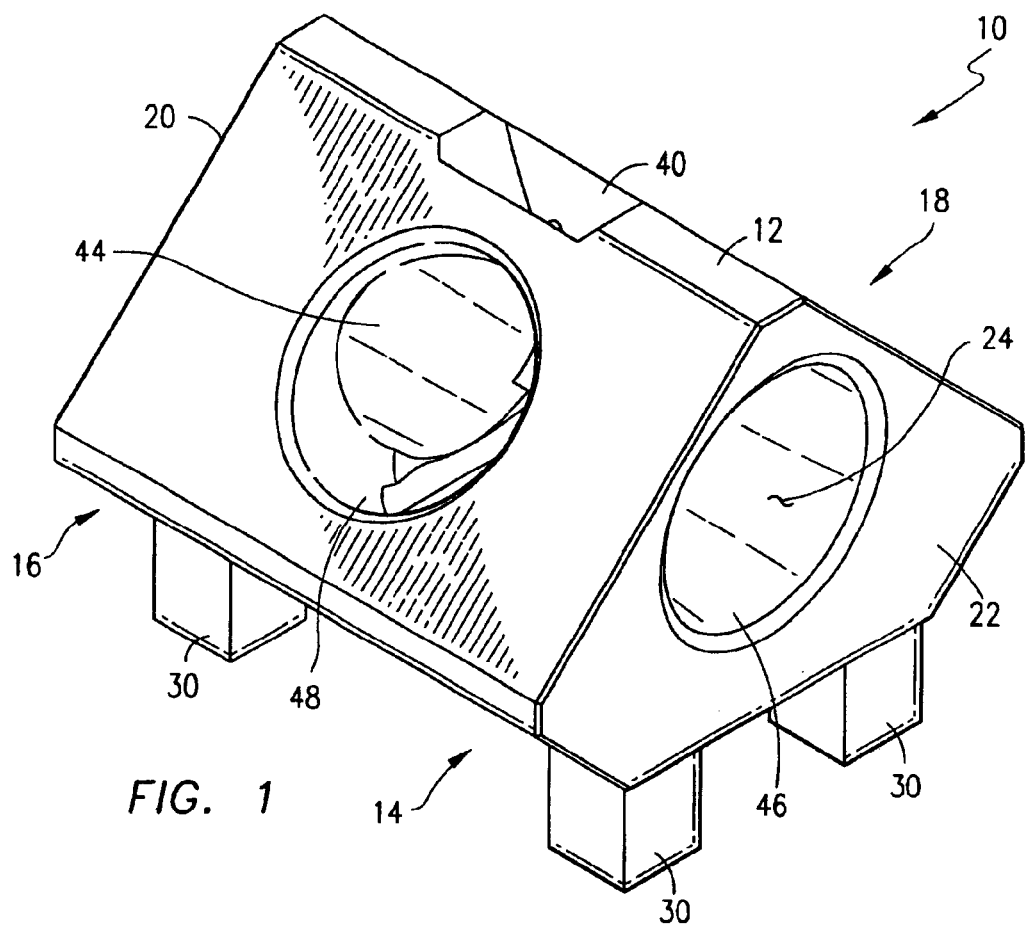
FIG. 1 is a perspective view of one embodiment of the modular unit of this invention.
Figure 2:
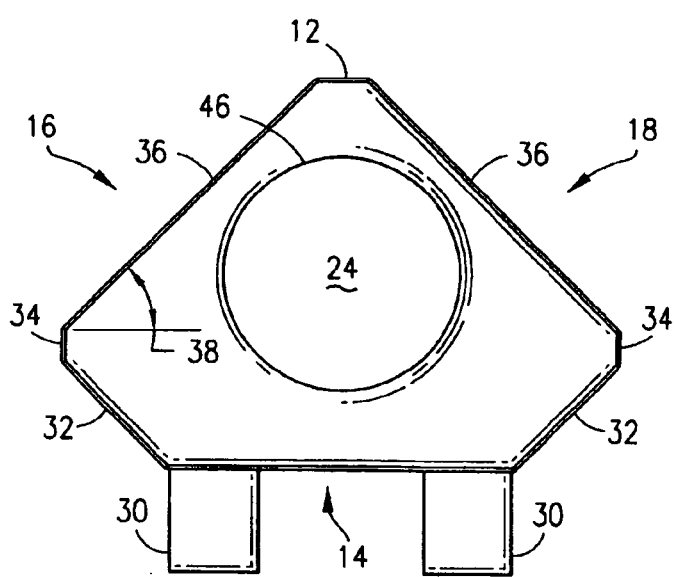
FIG. 2 is a front view of the modular unit of FIG. 1.
Figure 3:
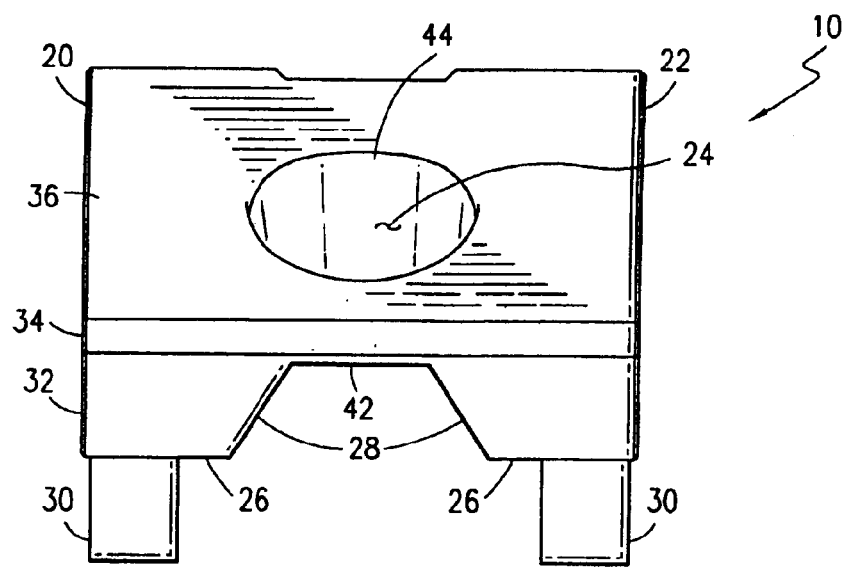
FIG. 3 is a side view of the modular unit of FIG. 1.

Referring initially to FIGS. 1–3, one embodiment of a modular unit 10 according to this invention is shown. The unit 10 comprises a top wall 12, a bottom wall 14, two side walls 16, 18 and two end walls 20, 22 which are interconnected to form a hollow interior 24. Each of the walls 12–22 is preferably formed of a marine concrete with no steel reinforcing bars or the like which can corrode upon exposure to salt water. The top wall 12 is substantially horizontally oriented and has a small cross-sectional area compared to the other walls of unit 10. As best seen in FIG. 3, the bottom wall 14 is formed with a generally horizontally disposed corner portion 26 at each of its four corners joined to an inwardly tapering transition portion 28. A support or leg 30 extends downwardly from each corner portion 26 of the bottom wall 14, for purposes described below. Each of the end walls 20 and 22 extends generally vertically from the bottom wall 14 and parallel to one another. As best seen in FIG. 2, each side wall 16 and 18 is formed with a lower section 32 tapering outwardly from the bottom wall 14, a generally vertical intermediate section 34 and an upper section 36 which tapers inwardly from the intermediate section 34 to the top wall 12. The angle 38 at which the upper section 36 tapers is preferably about 45°. For purposes of the present discussion, the terms "horizontal," "vertical,"

"upper," "lower," "top" and "bottom" refer to the orientation of the unit 10 as it is depicted in the Figs.

One important aspect of this invention is the provision of openings throughout the unit 10 to permit the flow of water through it, to provide a path for fish and other marine life to swim and take up residence within the interior 24 and to allow sunlight to shine on portions of the interior 24. The top wall 12 is formed with an opening 40, the bottom wall has an opening 42 formed at the juncture of the tapered transition portions 28, each of the side walls 16, 18 is formed with an opening 44 and the end walls 20, 22 each have an opening 46. See also FIG. 8. All of the openings 40–44 intersect the hollow interior 24 of the unit 10.

As discussed above, one disadvantage of many prior art designs of unit employed as artificial reefs, marine habitats and/or sea walls is an inherent instability when placed on the floor of a body of water, particularly during periods of high currents, storms and hurricanes. The unit 10 of this invention overcomes such deficiency in a number of respects. Initially, the angulation of the side walls 16, 18, as well as the overall height of the unit 10, enhance the stability of the unit 10. Preferably, the unit 10 is placed on the ocean floor or other body of water such that one of the side walls 16, 18 faces in the anticipated direction of the current, tide. or wave movement created by storms or the like. The flow of water over the low profile, vertically compact unit 10, and its angled side walls 16, 18, tends to exert a downward force on the unit 10, e.g. toward the floor of the body of water, adding to stability. Additionally, the opening 44 in each side wall 16, 18 has a rim 48 which is angled downwardly, toward the bottom wall 14. The flow of water through the opening 44 engages the angled rim 48 and tends to exert a downward force on the unit 10 to further stabilize it. The legs 30 also provide stabilization of the unit 10, as described below in connection with a discussion of FIGS. 10–12.

Figure 4:
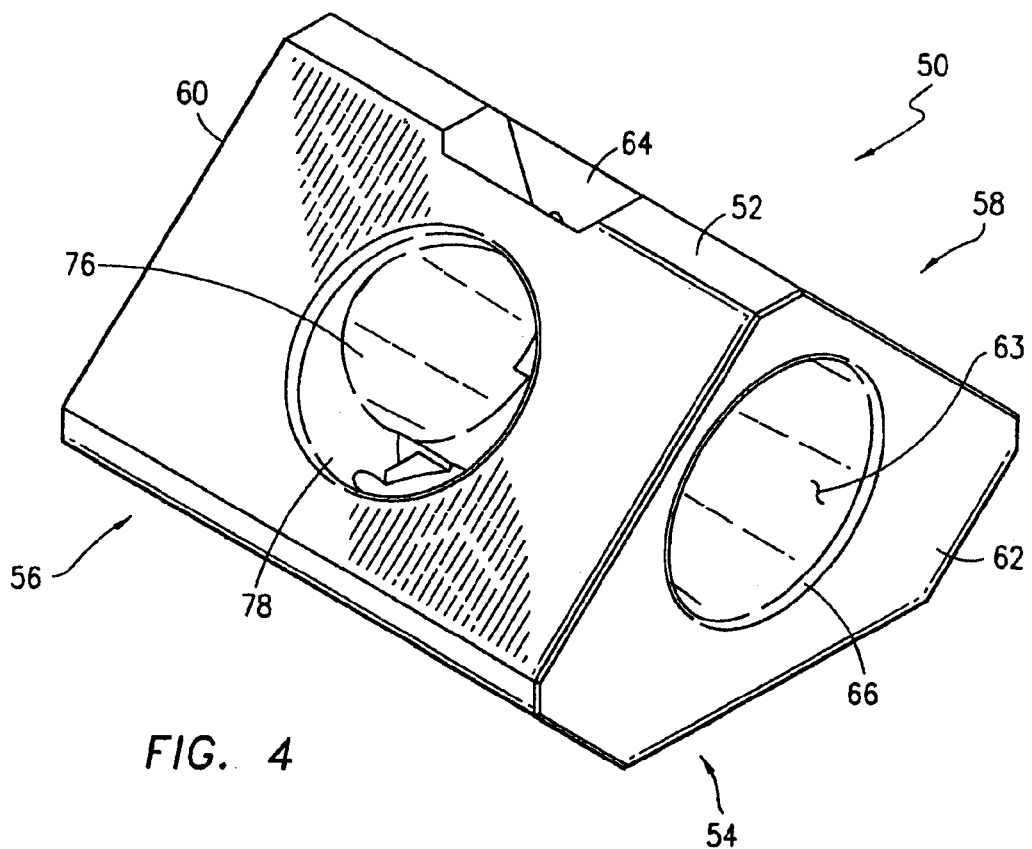
FIG. 4 is a perspective view of an alternative embodiment of the modular unit of this invention.
Figure 5:
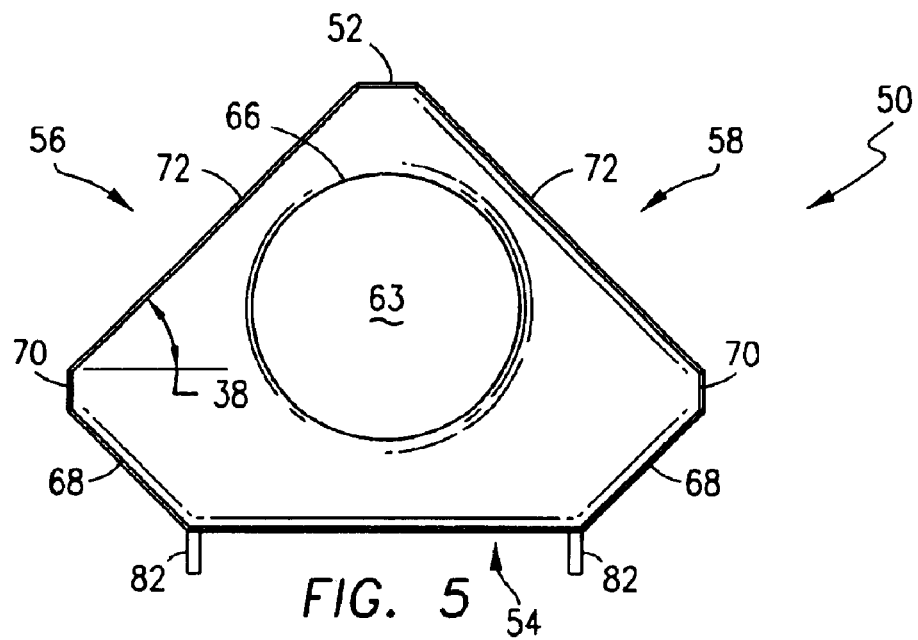
FIG. 5 is a front view of the modular unit of FIG. 4.
Figure 6:
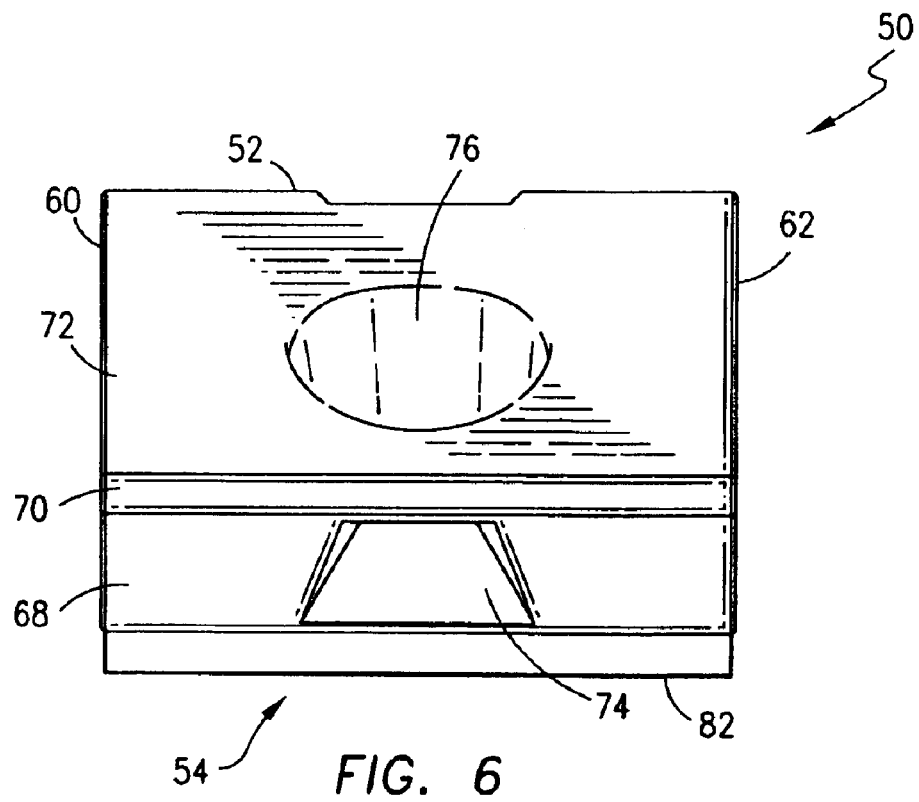
FIG. 6 is a side view of the modular unit of FIG. 4.

Referring now to FIGS. 4–6, an alternative embodiment of a modular unit 50 is shown which has a construction similar to that of unit 10. Unit 50 includes a top wall 52, a bottom wall 54, opposed side walls 56, 58 and opposed end walls 60, 62 interconnected to form a hollow interior 63. The top wall 52 and end walls 60, 62 of unit 50 are identical to the top wall 14 and end walls 20, 22 of unit 10, and have respective openings 64, 66 which are of the same dimension and location as openings 40 and 46 depicted in FIGS. 1–3.

Each side wall 56 and 58 has the same shape as side walls 16, 18 of unit 10, e.g. an outwardly extending lower section 68 connected to a vertical intermediate section 70, and an inwardly tapering upper section 72 connected between the intermediate section 70 and top wall 52. Preferably, the lower section 68 of each side wall 56, 58 is formed with an opening 74 and the upper section 72 is formed with an opening 76, both of which intersect the hollow interior 63. The opening 76 in the upper section 72 of each side wall 56, 58 is in the same position, and has the same dimension, as the opening 44 in side walls 16, 18 of unit 10. Preferably, such opening 76 is formed with a rim 78 angled downwardly toward the bottom wall 54 in the same manner as the rim 48 of unit 10. Further, the angle at which the upper section 72 is tapered is the same as the angle 38 of upper section 36 as shown in FIG. 2.

The bottom wall 54 of unit 50 is closed but the opening 74 in each side wall 56, 58 is located near the bottom wall 54 to permit ingress and egress of marine animals. Unlike the unit 10, no legs are formed along the bottom wall 54 of unit 50, although a small lip 82 may protrude from the bottom wall 54 as best seen in FIGS. 5 and 7.

Stacking of Modular Units

Figure 8:
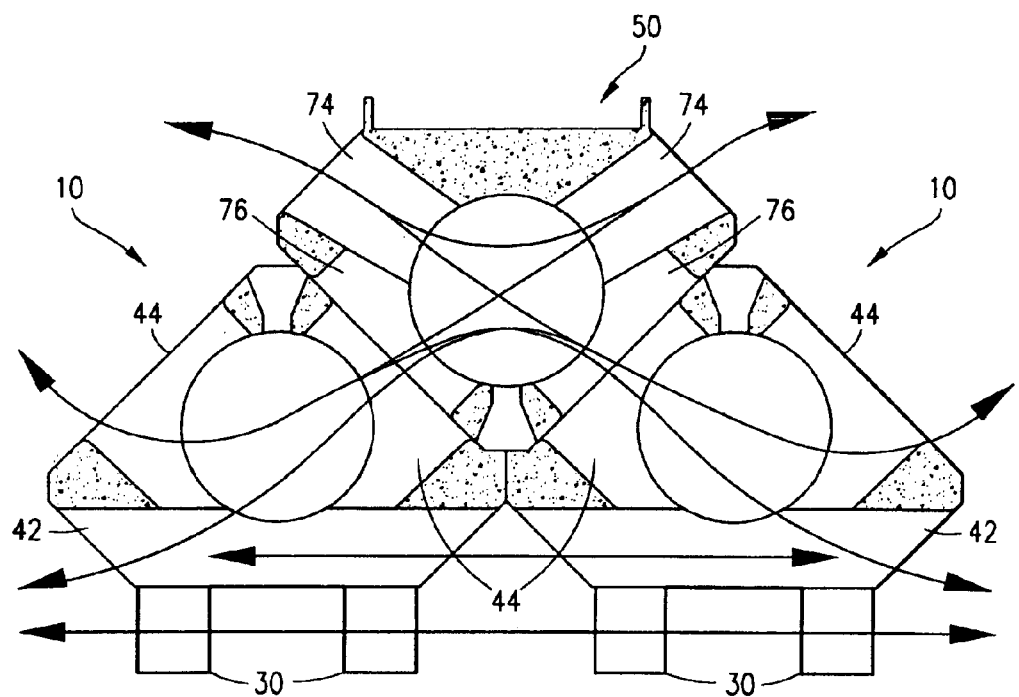
FIG. 8 is a cross sectional view taken generally along line 8—8 of FIG. 7.
Figure 9:
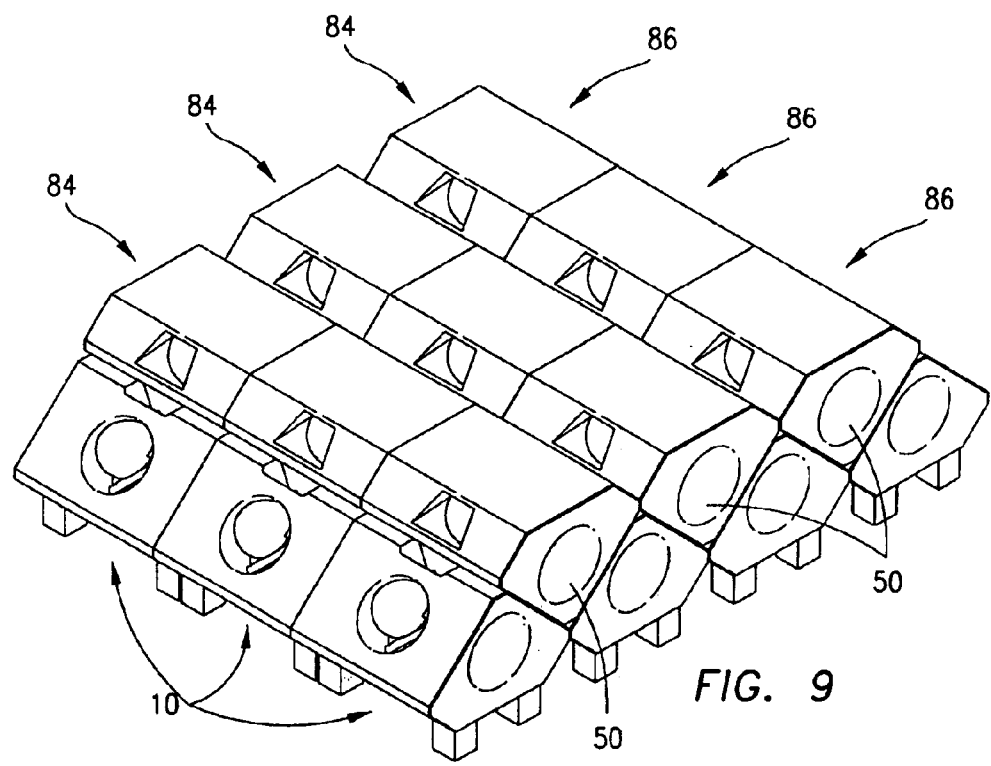
FIG. 9 is a view similar to FIG. 7 except with a number of groups of modular units arranged in an array.

Each of the modular units 10 and 50 may be placed on the floor of the ocean or other body of water individually for the purpose of forming an artificial reef, marine habitat and/or a sea wall. In many applications, however, it is desirable to provide a more substantial structure for such purposes. Referring now to FIGS. 7–9, illustrations are provided of modular units 10 and 50 which are arranged in columns and rows to form a stacked array or structure.

Figure 7:
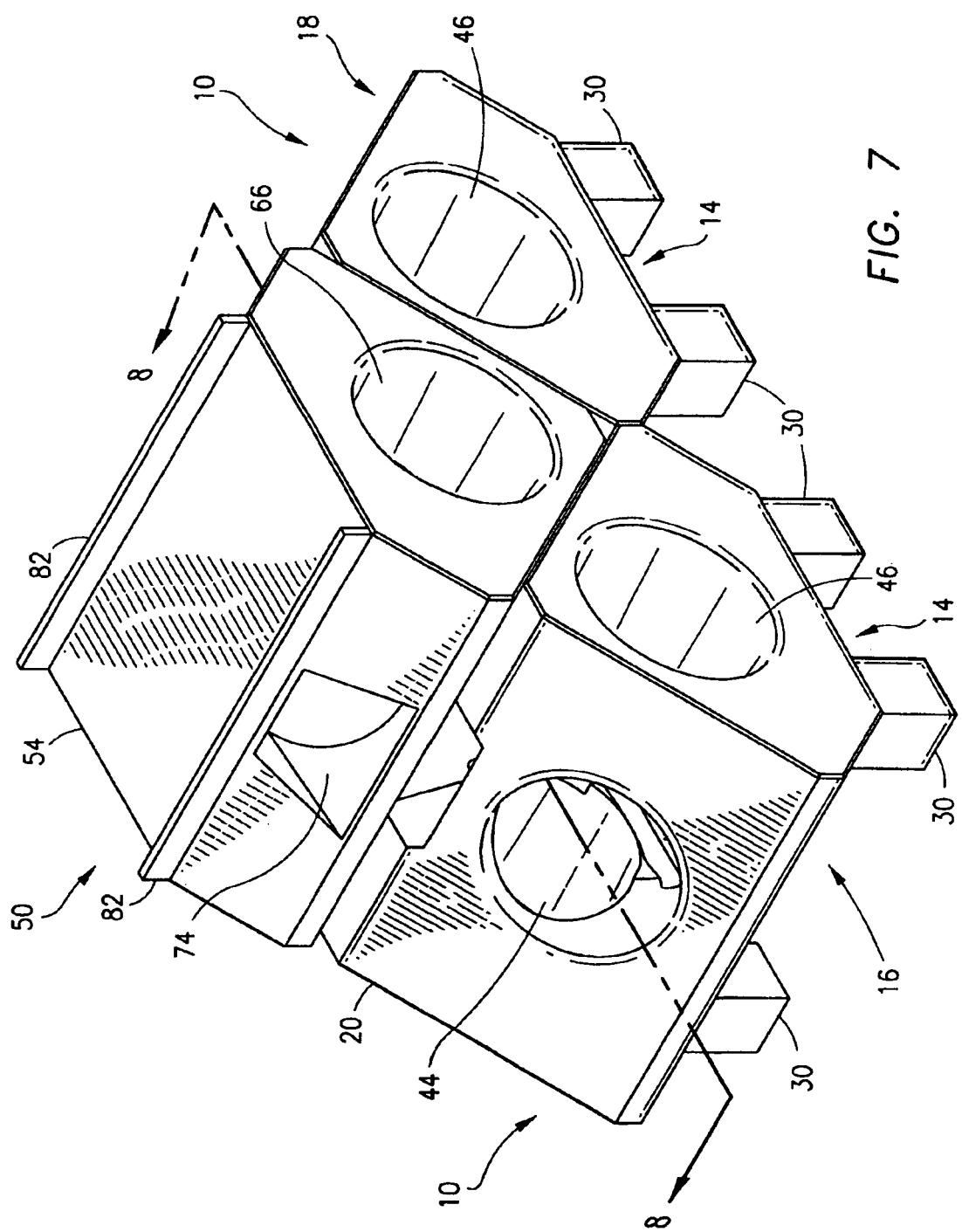
FIG. 7 is a perspective view of two modular units of FIG. 1 oriented side-by-side, with a modular unit of FIG. 4 placed in an inverted position between them.

In the embodiment of FIG. 7, two units 10 are placed side-by-side in the upright orientation with their legs 30 in position to contact the ocean floor or an anchoring device described below. Preferably, the vertical intermediate section 34 of the side wall 18 of one unit 10 contacts the vertical, intermediate section 34 of the side wall 16 of an adjacent unit 10. One unit 50 is then inverted and placed in between the two units 10 so that the bottom wall 54 of unit 50 faces upwardly and its top wall 52 faces downwardly. In this position, the opening 74 in the upper section 72 of each side wall 56 and 58 of unit 50 aligns with an opening 44 in the upper section 36 of a side wall 16 or 18 of one of the units 10. As depicted by the arrows in FIG. 8, when the units 10 and 50 are stacked in this orientation a number of paths are created for the flow of water and the transit of marine life through the structure. Because the units 10 have an opening 42 in their bottom wall 14, crustaceans and other marine life which might enter the structure will not become trapped inside.

FIG. 9 depicts one representation of a number of groups of units 10 and units 50 arranged in columns 84 and rows 86 in the same orientation shown in FIGS. 7 and 8. The openings 44 and 74 in the side walls 16, 18 and 56, 58, respectively, align with one another within each row 86 as described above. Additionally, the opening 46 in the end wall 20 of one unit 10 aligns with the opening 46 in the end wall 22 of an abutting unit 10 in each column 84. Essentially any of units 10 and 50 may be combined in this fashion to produce a marine habitat, artificial reef or barrier wall of desired dimension. It should also be understood that while FIGS. 7–9 depict arrays of units 10 and 50 wherein two units 10 are placed side-by-side with an inverted unit 50 between them, other arrangements may also be used. For example, three units 10 may be employed with one unit inverted, two units 50 may be placed side-by-side in an upright position with one unit 10 inverted between them, or, three units 50 can form the array.

Regardless of what combination of units 10 and 50 are employed to form the structure, essentially the same flow paths shown by the arrows in FIG. 8 are provided. Additionally, the structure retains a relatively low profile or short vertical height since the inverted unit 10 or 50 nestles in between the side-by-side units and extends only a short distance above them. This enhances the stability of the overall structure.

Mounting of Units to Ocean Floor

As described above, the units 10 are provided with a leg 30 extending from each corner portion 26 of the bottom wall 14, and the bottom wall 54 of the units 50 is formed with a lip 82. It is contemplated that either unit 10 or 50 may be placed directly on the floor of the ocean or other body of water, and the legs 30 or lip 82 will assist in stabilizing the units 10, 50 against movement which could be caused by currents, tides or wave action from storms and the like.

It is desirable for the units 10 and 50, particularly when arranged in a structure such as shown in FIGS. 7–9, to be oriented generally horizontally and vertically relative to one another so that the openings in the side walls and end walls of abutting units 10 and 50 align with one another as described above. In some locations, the floor of the ocean or other body of water may be relatively soft or silty, and/or have rocks or other obstructions. Conditions of this type can prevent the units 10 and 50 from properly aligning with one another or cause them to sink into the ocean floor and thus block some of the openings in the walls.

Figure 10:
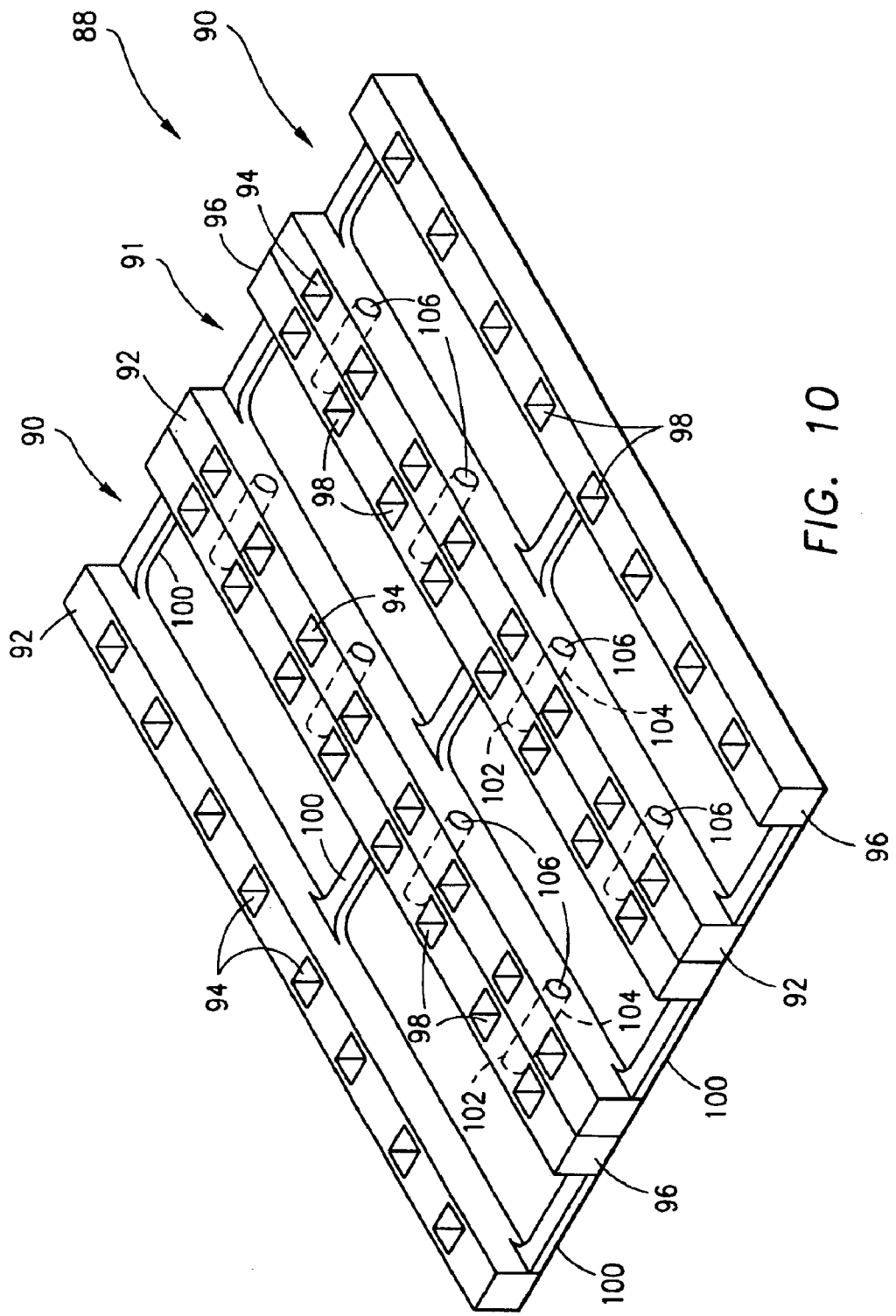
FIG. 10 is a perspective view of one embodiment of an anchoring device to mount the modular units of FIG. 1 to the floor of a body of water.
Figures 11, 12:
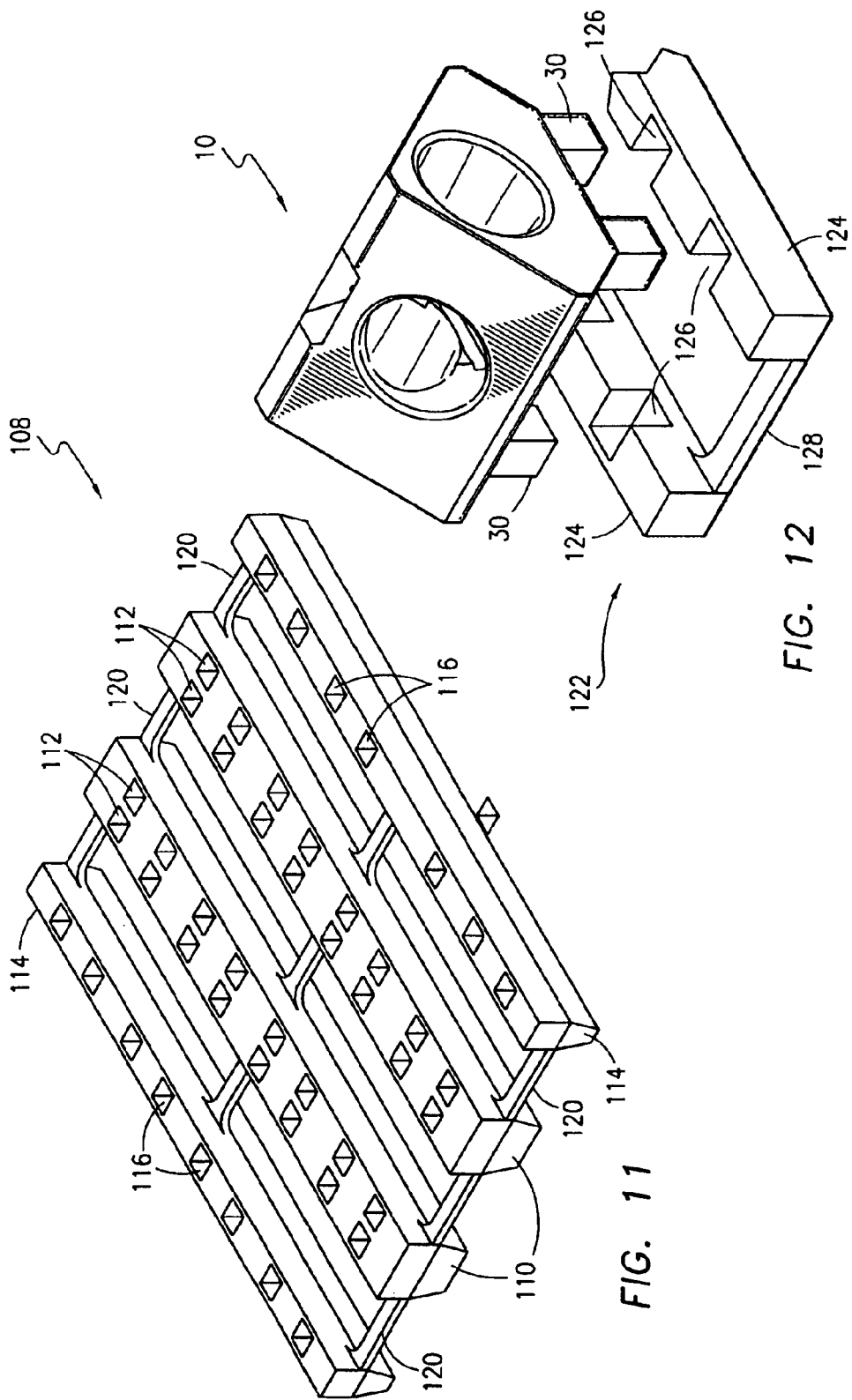
FIG. 11 is a perspective view of an alternative embodiment of an anchoring device according to this invention.
FIG. 12 is a partial perspective view of a still further embodiment of an anchoring device herein.

With reference to FIGS. 10–12, alternative embodiments of an anchoring device are shown which address the problem noted above. The anchoring device 88. of FIG. 10 comprises two outer rail units 90 and a center rail unit 91, each consisting of a first rail 92 having a number of spaced holes 94 and a second rail 96 formed with spaced holes 98. The first and second rails 92, 96 of each rail unit 90 are spaced from one another and connected by cross braces 100. The first and second rails 92 and 96 of the center rail unit 91 are formed with a number of bores 102 in their side walls which align with bores 104 formed in the side wall of the second rail 96 of one outer rail unit 90 and in the side wall of the first rail 92 of the other outer rail unit 90. These aligning bores 102 and 104 receive a connector bar 106 which functions to secure the abutting rails units 90 and 91 together.

The holes 94 and 98 in the first and second rails 92, 96 are formed to receive the legs 30 of the modular units 10. The units 10 straddle the first and second rails 92, 96 of each rail unit 90 and 91, so that two legs 30 of a unit 10 are inserted within the openings 94 of a first rail 92, and the other two legs 30 of the unit 10 seat within the openings 98 of a second rail 96. When the entire anchoring device 88 is filled with units 10, the units 10 located along the center rail unit 91 abut the units 10 on the two outer rail units 90.

Two additional embodiments of an anchoring device according to this invention are depicted in FIGS. 11 and 12. The anchoring device 108 of FIG. 11 consists of two inner rails 110 each formed with a number of longitudinally spaced pairs of holes 112, and two outer rails 114 each formed with a single set of longitudinally spaced holes 116. The inner rails 110 are connected to one another by cross braces 118, and to one of the outer rails 114 by cross braces 120. The modular units 10 are mounted to the anchoring device 108 by inserting the legs 30 into the holes 116 of an outer rail 114 and the holes 112 of an adjacent inner rail 110. Other modular units 10 can be mounted in between the two inner rails 110 by straddling the area where the cross braces 118 extend and inserting the legs 30 into adjacent holes 112 in the inner rails 110.

The anchoring device 122 of FIG. 12 consists of two rails 124 each having a number of spaced recesses 126 formed to receive the legs 30 of a modular unit 10 which spans the two rails 124. Preferably, the rails 124 are connected by cross braces 128.

In each of the embodiments of FIGS. 10–12, the anchoring devices 88, 108 and 122 provide a platform for mounting the modular units 10 and 50 above the floor of the body of water and in the proper orientation relative to one another as described above. It is contemplated that the anchoring devices 88, 108 or 122 could be connected to the units 10 and 50 prior to placement on the floor of the body of water or by divers underwater. Further, marine concrete or other fastening materials can be employed to secure the units 10 and 50 to the anchoring devices 88, 108 or 122, and to one another, before or after placement in the water. Although the anchoring devices 88, 108 and 122 depicted in FIGS. 10–12 having openings to receive the legs 30 of units 10, it is contemplated that a concrete slab could be employed with no openings as an alternative.

While the invention has been described with reference to a preferred embodiment, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for underwater applications, comprising:
   a modular unit having a top wall, a bottom wall, two side walls and two end walls interconnected to form a hollow interior;
   each of said side walls having a tapered section formed with a through bore which intersects said hollow interior;
   each of said end walls extending generally vertically between said bottom wall and said top wall, said end walls each being formed with a through bore which intersects said hollow interior;
   said top wall being formed with a through bore which intersects said hollow interior;
   said modular unit being capable of being placed in an upright orientation with said top wall vertically above said bottom wall, and in an inverted orientation with said top wall vertically below said bottom wall;
   said tapered section of each of said side walls being formed so that when one modular unit is placed in an upright orientation said tapered section of each of said side walls thereof is capable of engaging said tapered section of one of said side walls of a second modular unit placed in an inverted orientation adjacent thereto with said through bores in respective ones of said tapered sections aligning with one another.

2. The apparatus of claim 1 in which said through bore of one of said end walls substantially aligns with said through bore of said other of said end walls.

3. The apparatus of claim 1 in which said tapered section of each of said side walls extends at an angle of about 45°.

4. The apparatus of claim 1 in which said through bore in each of said side walls is formed with an angled, lower portion extending in a direction toward said bottom wall, said angled, lower portion being contacted by a flow of water entering said hollow interior of said modular unit to create a downward force on said modular unit tending to enhance the stabilization thereof on the floor of a body of water.

5. The apparatus of claim 1 further including at least one support extending from said bottom wall, said at least one support being effective to assist stabilizing said modular unit on the floor of a body of water.

6. The apparatus of claim 5 in which said at least one support is a number of legs extending from said bottom wall.

7. The apparatus of claim 5 in which said at least one support is a lip extending from the periphery of said bottom wall.

8. The apparatus of claim 5 in which said modular unit forms an artificial reef and marine habitat along the floor of a body of water.

9. The apparatus of claim 5 in which said modular unit is positioned within a body of water relative to a beach at the edge of said body of water to form a sea wall.

10. Apparatus for underwater applications, comprising:
a modular unit including:
(i) a top wall, a bottom wall, two side walls and two end walls interconnected to form a hollow interior,
(ii) each of said side walls having a tapered section formed with a through bore which intersects said hollow interior;
(iii) each of said end walls extending generally vertically between said bottom wall and said top wall, said end walls each being formed with a through bore which intersects said hollow interior;
(iv) said top wall being formed with a through bore which intersects said hollow interior;
(v) at least one support extending from said bottom wall of said modular unit;
an anchoring device adapted to rest upon the floor of the body of water, said anchoring device being formed with mounting structure which engages said at least one support to connect said modular unit to said anchoring device.

11. The apparatus of claim 10 in which said at least one support is a number of legs extending from said bottom wall.

12. The apparatus of claim 11 in which said anchoring device comprises at least one rail unit which includes a first rail and a second rail spaced from said first rail, each of said first and second rails being formed with a number of openings, said modular unit being placed in position to straddle said first and second rails so that each of said legs of said modular unit is received within an opening in one of said first and second rails.

13. The apparatus of claim 12 in which said first rail and said second rail of said at least one rail unit are connected to one another by at least one cross brace.

14. The apparatus of claim 12 in which a number of rail units are positioned side-by-side in abutting relationship, said first rail and said second rail of those rail units which abut one another being formed with aligning mounting holes, said aligning mounting holes receiving a connector extending between said rail units to secure abutting rail units together.

15. The apparatus of claim 11 in which said anchoring device includes at least one rail unit having a first rail and a second rail connected together by at least one cross brace, each of said first and second rails being formed with a recess which receives one of said legs extending from said bottom wall.

16. The apparatus of claim 11 in which said anchoring device comprises first and second outer rails and first and second inner rails, each of said first and second outer rails being formed with a row of spaced openings, each of said first and second inner rails being formed with two side-by-side rows of spaced openings, said first and second inner rails being connected to one another and to one of said first and second outer rails.

17. The apparatus of claim 16 in which said spaced openings in said first and second outer rails and in said first and second inner rails are positioned so that said legs of said modular unit are received within said openings in one of said inner rails and in one of said outer rails.

18. The apparatus of claim 17 in which said first and second inner rails are positioned relative to one another so that said legs of said modular unit are received within one row of said openings in said first inner rail and one row of said openings in said second inner rail.

19. A marine structure for underwater applications, comprising:
a number of modular units each including:
(i) a top wall, a bottom wall, two side walls and two end walls interconnected to form a hollow interior,
(ii) each of said side walls having a tapered section formed with a through bore which intersects said hollow interior;
(iii) each of said end walls extending generally vertically between said bottom wall and said top wall, said end walls each being formed with a through bore which intersects said hollow interior;
(iv) said top wall being formed with a through bore which intersects said hollow interior;
each of said modular units being capable of being placed in an upright orientation with said top wall vertically above said bottom wall, and in an inverted orientation with said top wall vertically below said bottom wall;
a first group of modular units being located side-by-side in an upright orientation along the floor of a body of water, and a second group of modular units being located in between adjacent first modular units and placed in an inverted orientation so that said tapered section of each side wall of a modular unit in said second group contacts said tapered section of one side wall of one modular unit and said tapered section of one side wall of an adjacent modular unit in said first group.

20. The marine structure of claim 19 in which said through bore in said tapered section of said side walls of each modular unit in said first group aligns with said through bore in said tapered section of one side wall of a modular unit in said second group.

21. The marine structure of claim 19 in which said first and second groups of modular units form a first row, a third group of modular units and a fourth group of modular units forming a second row, said modular units of said third and fourth groups being placed end-to-end relative to said modular units of said first and second groups.

22. The marine structure of claim 21 in which said third group of modular units are located side-by-side in an upright orientation along the floor of a body of water, and said fourth group of modular units are located in between adjacent third modular units and placed in an inverted orientation so that each side wall of a modular unit in said fourth group contacts one side wall of one modular unit and one side wall of an adjacent modular unit in said third group.

23. The marine structure of claim 22 in which said through bore in said tapered section of said side walls of each modular unit in said third group aligns with said through bore in said tapered section of one side wall of a modular unit in said fourth group.

24. The marine structure of claim 21 in which said through bore in one end wall of said first and second modular units of said first row aligns with said through bore in one end wall of an adjacent third and fourth modular unit, respectively, of said second row.

25. The marine structure of claim 19 in which each wall of said modular unit has an exterior surface, said exterior surface of at least some of said walls being formed with indentations.

26. The marine structure of claim 19 in which said through bore of one of said end walls substantially aligns with said through bore of said other of said end walls.

27. The marine structure of claim 19 in which said tapered section of each of said side walls extends at an angle of about 45°.

28. The marine structure of claim 19 in which said through bore in said side walls of each modular unit is formed with an angled, lower portion extending in a direction toward said bottom wall, said angled, lower portion being contacted by a flow of water entering said hollow interior of said modular unit to create a downward force on said modular unit tending to enhance the stabilization thereof on the floor of a body of water.

29. The marine structure of claim 19 in which each of said modular units has a number of supports extending from said bottom wall, said supports being adapted to assist the stabilization of said modular units on the floor of a body of water.

30. The marine structure of claim 29 in which said supports are a number of legs extending from said bottom wall.

31. The marine structure of claim 29 in which said supports is a lip extending from the periphery of said bottom wall.

32. The marine structure of claim 19 in which said first group and said second group of modular units collectively form a barrier reef.

33. The marine structure of claim 19 in which said first group and said second group of modular units collectively form a marine habitat.

34. The marine structure of claim 19 in which said first group and said second group of modular units collectively form a sea wall.

* * * * *